(12) United States Patent
Ma et al.

(10) Patent No.: US 11,953,991 B2
(45) Date of Patent: Apr. 9, 2024

(54) METHOD, DEVICE AND COMPUTER PROGRAM PRODUCT FOR STORAGE MANAGEMENT

(71) Applicant: Dell Products L.P., Round Rock, TX (US)

(72) Inventors: Chun Ma, Beijing (CN); Jianbin Kang, Beijing (CN); Hongpo Gao, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/887,785

(22) Filed: Aug. 15, 2022

(65) Prior Publication Data

US 2023/0214300 A1 Jul. 6, 2023

(30) Foreign Application Priority Data

Dec. 31, 2021 (CN) .......................... 202111668200.0

(51) Int. Cl.
*G06F 11/10* (2006.01)
*G06F 3/06* (2006.01)
*G06F 11/07* (2006.01)

(52) U.S. Cl.
CPC ........ *G06F 11/1088* (2013.01); *G06F 3/0619* (2013.01); *G06F 3/0659* (2013.01); *G06F 3/0689* (2013.01); *G06F 11/076* (2013.01)

(58) Field of Classification Search
CPC .. G06F 11/10; G06F 11/1088; G06F 11/1076; G06F 3/0619; G06F 3/0659
See application file for complete search history.

(56) References Cited

U.S. PATENT DOCUMENTS

| | | | |
|---|---|---|---|
| 7,590,801 B1* | 9/2009 | Gavarre | G06F 11/1084 711/114 |
| 10,210,045 B1 | 2/2019 | Gao et al. | |
| 10,289,507 B1 | 5/2019 | Malwankar et al. | |
| 10,936,419 B2 | 3/2021 | Xu et al. | |
| 11,385,823 B2 | 7/2022 | Yang et al. | |
| 11,770,448 B1* | 9/2023 | Peake | G06F 3/067 707/692 |
| 2014/0317226 A1* | 10/2014 | Resch | G06F 11/1076 709/216 |
| 2014/0344617 A1* | 11/2014 | Resch | G06F 11/1088 714/6.31 |
| 2015/0149861 A1* | 5/2015 | Grube | G06F 11/1088 714/763 |
| 2015/0154074 A1* | 6/2015 | Resch | G06F 11/1076 714/764 |
| 2017/0060686 A1* | 3/2017 | Resch | G06F 11/1092 |
| 2017/0060690 A1* | 3/2017 | Trichardt | G06F 11/1092 |

(Continued)

*Primary Examiner* — Kamini B Patel
(74) *Attorney, Agent, or Firm* — BainwoodHuang

(57) ABSTRACT

Techniques for storage management involve determining a plurality of storage units to be reconstructed on a group of disks, the plurality of storage units being distributed on different disks in the group of disks. Such techniques further involve selecting, based on the distribution of the plurality of storage units on the group of disks, a group of storage units from the plurality of storage units so that different storage units in the group of storage units are distributed on different disks. Such techniques further involve performing concurrent reconstruction on the group of storage units.

17 Claims, 8 Drawing Sheets

(56) References Cited

U.S. PATENT DOCUMENTS

| | | | | |
|---|---|---|---|---|
| 2017/0300374 A1* | 10/2017 | Gladwin | ............. | G06F 11/1084 |
| 2018/0101435 A1* | 4/2018 | Viraraghavan | ..... | G06F 11/1076 |
| 2018/0101437 A1* | 4/2018 | Wozniak | ............. | G06F 11/1092 |
| 2018/0101438 A1* | 4/2018 | Kazi | ................... | G06F 11/2082 |
| 2019/0250823 A1* | 8/2019 | Resch | ................ | G06F 11/1076 |
| 2019/0377640 A1* | 12/2019 | Critchley | ............ | G06F 11/1076 |

\* cited by examiner

METHOD, DEVICE AND COMPUTER PROGRAM PRODUCT FOR STORAGE MANAGEMENT

CROSS-REFERENCE TO RELATED APPLICATION

This application claims priority to Chinese Patent Application No. CN202111668200.0, on file at the China National Intellectual Property Administration (CNIPA), having a filing date of Dec. 31, 2021, and having "METHOD, DEVICE, AND COMPUTER PROGRAM PRODUCT FOR STORAGE MANAGEMENT" as a title, the contents and teachings of which are herein incorporated by reference in their entirety.

TECHNICAL FIELD

Embodiments of the present disclosure relate to storage management technologies, and more particularly, to a method, a device, and a computer program product for storage management.

BACKGROUND

Redundant Array of Independent Disk (RAID) is an array formed by combining a plurality of independent physical hard disks. The array is used as a logical virtual hard disk to provide better storage performance and reliability. RAID usually stores data by using the striping technology. In a RAID, each physical hard disk may be divided into a plurality of slices. Slices on a plurality of physical hard disks may be combined to form a stripe, which serves as a logical storage unit to store data with certain redundancy. For example, in RAID 5, 5 slices on 5 disks may be used to form a stripe.

When a disk in a RAID fails, data on other disks may be used to reconstruct affected logical storage units. The efficiency of reconstructing these logical storage units is affected by many factors. Those skilled in the art have improved the reconstruction efficiency by optimizing the number and size of slices of logical units. However, these considerations are not comprehensive.

SUMMARY OF THE INVENTION

In a first aspect of the present disclosure, a method for storage management is provided. The method includes: determining a plurality of storage units to be reconstructed on a group of disks, the plurality of storage units being distributed on different disks in the group of disks; selecting, based on the distribution of the plurality of storage units on the group of disks, a group of storage units from the plurality of storage units so that different storage units in the group of storage units are distributed on different disks; and performing concurrent reconstruction on the group of storage units.

In a second aspect of the present disclosure, an electronic device is provided. The electronic device includes a processor and a memory that is coupled to the processor and has instructions stored therein. The instructions, when executed by the processor, cause the device to execute actions including: determining a plurality of storage units to be reconstructed on a group of disks, the plurality of storage units being distributed on different disks in the group of disks; selecting, based on the distribution of the plurality of storage units on the group of disks, a group of storage units from the plurality of storage units so that different storage units in the group of storage units are distributed on different disks; and performing concurrent reconstruction on the group of storage units.

In a third aspect of the present disclosure, a computer program product is provided. The computer program product is tangibly stored on a computer-readable medium and includes machine-executable instructions. The machine-executable instructions, when executed, cause a machine to execute the method according to the first aspect of the present disclosure.

It should be noted that the Summary of the Invention part is provided to introduce a selection of concepts in a simplified manner, which will be further described in the Detailed Description below. The Summary of the Invention part is neither intended to identify key features or major features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent, where.

In all the drawings, the same or similar reference numerals represent the same or similar elements.

DETAILED DESCRIPTION

Figure 1:
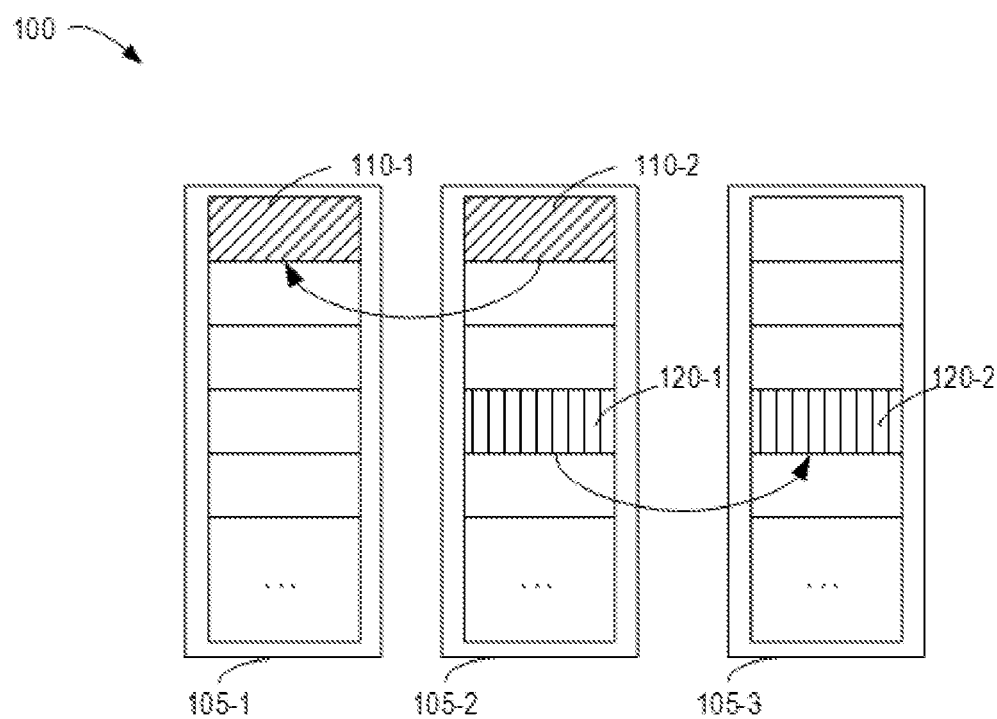
FIG. 1 shows a simplified example where characteristics of a physical disk affect storage unit reconstruction.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The following will describe embodiments of the present disclosure in more detail with reference to the accompanying drawings. Although the accompanying drawings show certain embodiments of the present disclosure, it should be understood that the present disclosure can be implemented in various forms and should not be limited by the embodiments described herein. Instead, these embodiments are provided to enable a more thorough and complete understanding of the present disclosure. It should be understood that the accompanying drawings and embodiments of the present disclosure are for illustrative purposes only, and are not intended to limit the protection scope of the present disclosure.

The term "include" and its variants as used herein mean open-ended inclusion, i.e., "including but not limited to." The term "based on" is "based at least in part on." The term "one embodiment" means "at least one embodiment." The term "another embodiment" means "at least one further embodiment." Relevant definitions of other terms will be given in the description below.

Unlike solid state drives (SSD), the performance of hard disk drives (HDD) varies with an input/output (I/O) mode. Head seek time is a factor that cannot be ignored in an HDD I/O delay. Due to physical characteristics of a hard disk, a basic rule of reducing an average seek time and optimizing the performance of the hard disk is avoiding random I/O or head swinging between two logical block address (LBA) ranges.

However, a conventional storage reconstruction mechanism (such as reconstruction of a stripe in a RAID) does not take into consideration the correlation between HDD characteristics and concurrent reconstruction of storage units. The conventional storage reconstruction mechanism usually selects storage units for repair according to an LBA sequence, and therefore, a plurality of storage units partially located on the same disk may be selected to perform concurrent reconstruction. For example, two RAID stripes selected for concurrent reconstruction may each have a slice located on the same disk. In this case, there are two slices on the disk that need to be read/written at the same time during reconstruction. This causes the head of the hard disk to swing between the slices, resulting in an increase in the I/O delay, which in turn leads to a decrease in the reconstruction performance.

FIG. 1 shows simplified example 100 where characteristics of a physical disk affect storage unit reconstruction. Example 100 illustrates storage unit 110 and storage unit 120 that need to be reconstructed and are distributed on a group of disks 105-1, 105-2, and 105-3, where storage unit 110 has part 110-1 and part 110-2, and storage unit 120 has part 120-1 and part 120-2. Both part 110-2 of storage unit 110 and part 120-1 of storage unit 120 are located on disk 105-2 (for example, each is located on one slice of disk 105-2). When reconstructing storage unit 110, data needs to be read from the location of part 110-2 and written to the location of part 110-1. When reconstructing storage unit 120, data needs to be read from the location of part 120-1 and written to the location of part 120-2. Therefore, when it is selected to reconstruct storage unit 110 and storage unit 120 at the same time, a head of disk 105-2 will swing back and forth between the location of part 110-2 and the location of part 120-1. This results in that the I/O performance of disk 120 may be the same as or even worse than that of reading data from only one of the locations, thereby reducing the reconstruction efficiency.

The problem shown in the simplified example in FIG. 1 also exists in more complex scenarios. For example, in an example reconstruction performance test, when a conventional method is used to reconstruct data on one disk for a storage system with 15 disks, the performance of performing a reconstruction task on one single disk is the same as that of performing 8 reconstruction tasks on two disks. This means that the bottleneck of storage reconstruction performance is the physical hard disk, not the CPU, memory, or other parameters.

In order to at least partially solve the above problems and other potential problems, a solution for storage management is proposed in the embodiments of the present disclosure. The solution selects a subset of storage units that need to be repaired in each reconstruction iteration, so that disks on which different storage units in the subset are distributed do not overlap with each other, and concurrent reconstruction is performed on the selected storage units. On the one hand, this solution can use as many physical disks as possible to concurrently reconstruct storage units at the same time, thereby improving the reconstruction efficiency. On the other hand, this solution can prevent one disk from participating in reconstruction tasks of two storage units (such as a stripe in a RAID) at the same time, thereby avoiding the head of the hard disk from swinging back and forth, thus further improving the reconstruction efficiency. This solution will be described below in the context of RAID striped storage, but it should be understood that this solution is also applicable to other organizational forms of logical storage units distributed on a plurality of physical disks.

Figure 2:
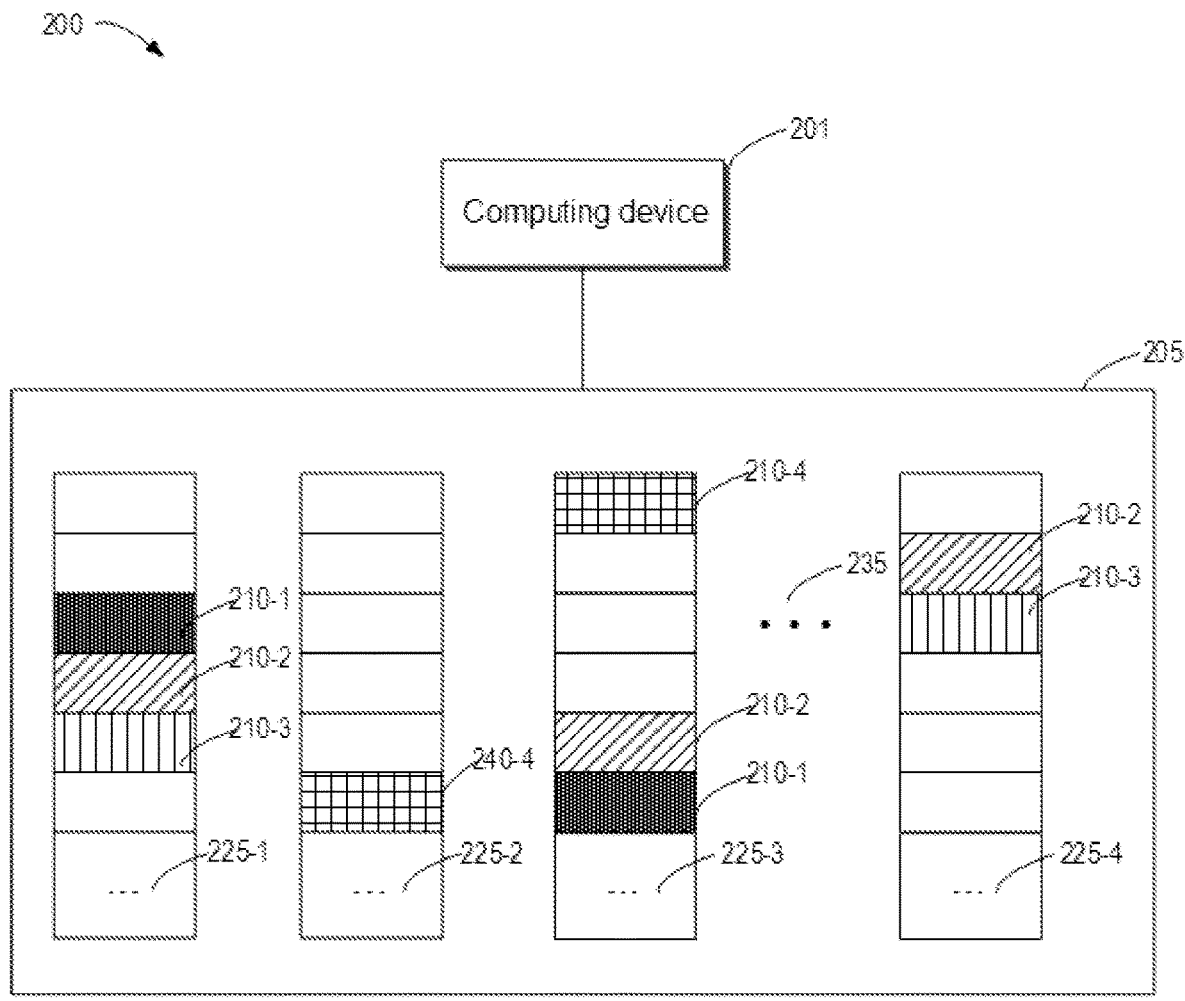
FIG. 2 shows a schematic diagram of an example environment in which embodiments of the present disclosure can be implemented.

FIG. 2 is a schematic diagram of example environment 200 in which embodiments of the present disclosure can be implemented. As shown in FIG. 2, environment 200 includes a group of disks 205. A plurality of storage units 210 to be reconstructed are distributed on the group of disks 205, and each of the storage units is distributed on a plurality of different disks in the group of disks 205.

As an example, FIG. 2 shows some parts of storage units 210-1, 210-2, 210-3, and 210-4 in the plurality of storage units 210, and these parts are distributed at different storage locations (for example, different slices) on the disks in the group of disks 205. It should be understood that the number of disks, the number of storage units, and the distribution of the storage units shown in FIG. 2 are only examples. Ellipses 225-1, 225-2, 225-3, and 225-4 indicate that these disks may also have more storage locations not shown, and other parts of storage units 210-1 to 210-4, other storage units in the plurality of storage units 210, and storage units that do not need to be reconstructed may be distributed therein. Ellipsis 235 indicates that there may be more disks not shown in environment 225, and other parts of storage units 210-1 to 210-4, other storage units in the plurality of storage units 210, and storage units that do not need to be reconstructed may also be distributed on the disks not shown. In addition, the storage units may also be distributed on the group of disks 205 in a manner different from that shown in FIG. 2.

FIG. 2 also shows computing device 201, which may select a group of storage units from the plurality of storage units 210 to simultaneously reconstruct (i.e., concurrently reconstruct) the group of storage units. As will be described in detail below, computing device 201 may select, by using the method according to an embodiment of the present disclosure, the group of storage units to perform concurrent reconstruction.

It should be understood that environment 200 is described for illustrative purposes only and do not imply any limitation to the scope of the present disclosure. Environment 200 may also include devices, components, and other entities not shown in FIG. 2. Moreover, the embodiments of the present disclosure may also be applied in an environment different from environment 100.

Figure 3:
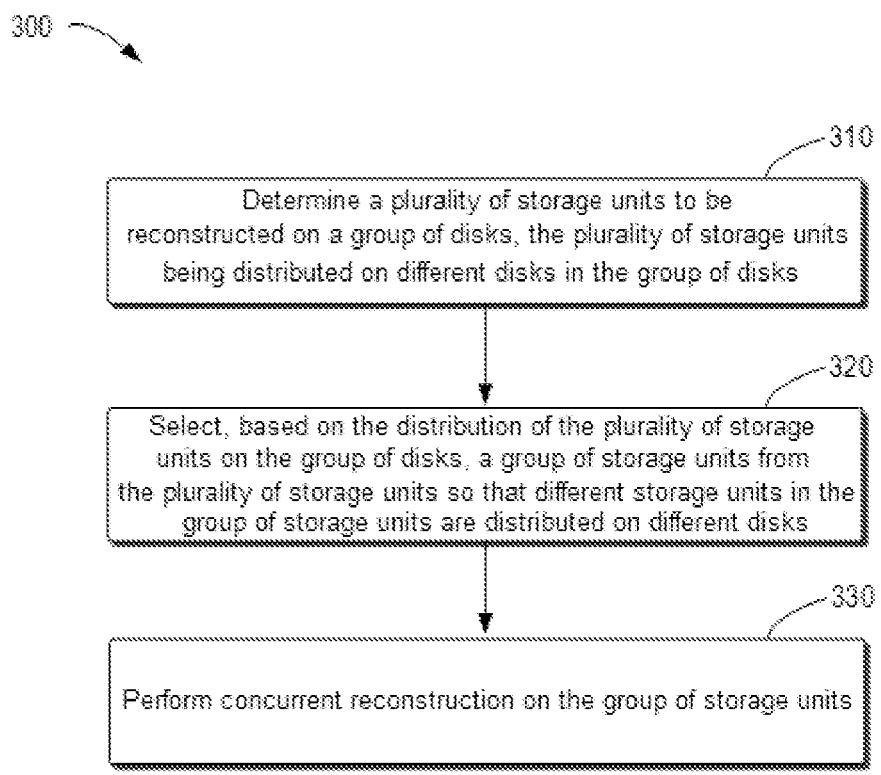
FIG. 3 shows a flow chart of a method for storage management according to some embodiments of the present disclosure.

FIG. 3 shows a flow chart of method 300 for storage management according to some embodiments of the present disclosure. Method 300 may be performed by, for example, computing device 201 (more specifically, a processor of computing device 201). Method 300 is described in detail below with reference to FIG. 2.

At block 310, computing device 201 determines a plurality of storage units to be reconstructed on a group of disks, the plurality of storage units being distributed on different disks in the group of disks. For example, when a disk (not shown) used for storing data together with a group of disks 201 in environment 200 fails, parts of the plurality of storage units 210 that are previously located on the failed disk may be redistributed on the group of disks 205 (respectively distributed to different slices of different disks), and the plurality of storage units 210 need to be reconstructed to restore data. Computing device 201 may determine the plurality of storage units in any manner, including determining in response to receiving information about the plurality of storage units, and the scope of the present disclosure is not limited thereto.

At block 320, computing device 201 selects, based on the distribution of the plurality of storage units on the group of disks, a group of storage units from the plurality of storage units so that different storage units in the group of storage units are distributed on different disks. That is, there is no overlap between the disks on which any two storage units in the selected group of storage units are distributed.

In some embodiments, for example, in order to avoid consuming too much system resources, computing device 201 may limit the number of concurrently reconstructed storage units within a certain threshold, that is, the selected group of storage units does not exceed the threshold. For example, during the selection of a group of storage units, computing device 201 may count the number of selected storage units, and consider that the selection has been completed when the count reaches the threshold.

In some embodiments, when different storage units are distributed on different disks, computing device 201 may select the group of storage units in such a manner that the selected storage units are distributed on as many disks as possible. In this way, computing device 201 may use as many disk resources as possible in subsequent concurrent reconstruction, thereby improving the reconstruction efficiency. This selection method will be described later in more detail with reference to FIG. 4.

In some embodiments, the storage units in the plurality of storage units 210 may have respective priorities. For example, in a RAID, stripes as storage units may be classified into different layers based on storage types (such as layer 0 as a high-performance storage layer, layer 1 with a RAID 1 type, and layer 2 with a RAID 5 type), and these layers have different reconstruction priorities. In such embodiment, computing device 201 may select storage units in a group of storage units according to the priorities of the storage units.

In some embodiments, computing device 201 may select one or more storage units from storage units with the same priority as the storage units in the group of storage units, so that different storage units in the group of storage units are distributed on different disks. In some embodiments, according to a sequence of priorities from high to low, computing device 201 may select one or more storage units from storage units with different priorities as storage units in the group of storage units, so that different storage units in the group of storage units are distributed on different disks. In some embodiments, computing device 201 may select storage units for a certain number of priorities (for example, two priorities).

In some embodiments where storage units have different priorities, computing device 201 may also select the group of storage units in a manner such that the selected storage units are distributed on as many disks as possible. This selection method will be described later in more detail with reference to FIG. 6.

At block 330, computing device 201 performs concurrent reconstruction on the group of storage units. For example, in a RAID, a computing device may recover data by reading data from one slice (i.e., a part of a storage unit) of a stripe (i.e., the storage unit) to write to another slice of the stripe. The scope of the present disclosure is not limited by specific reconstruction operations.

In some embodiments, after performing concurrent reconstruction on the selected group of storage units, computing device 201 may continue to use method 200 to determine the remaining plurality of storage units to be reconstructed, and select another group of storage units therefrom to perform concurrent reconstruction. After performing several concurrent reconstructions in this manner, if any two disks, in the group of disks, where storage units that need to be repaired are distributed overlap with each other, computing device 201 may sequentially reconstruct the remaining storage units.

Figure 4:
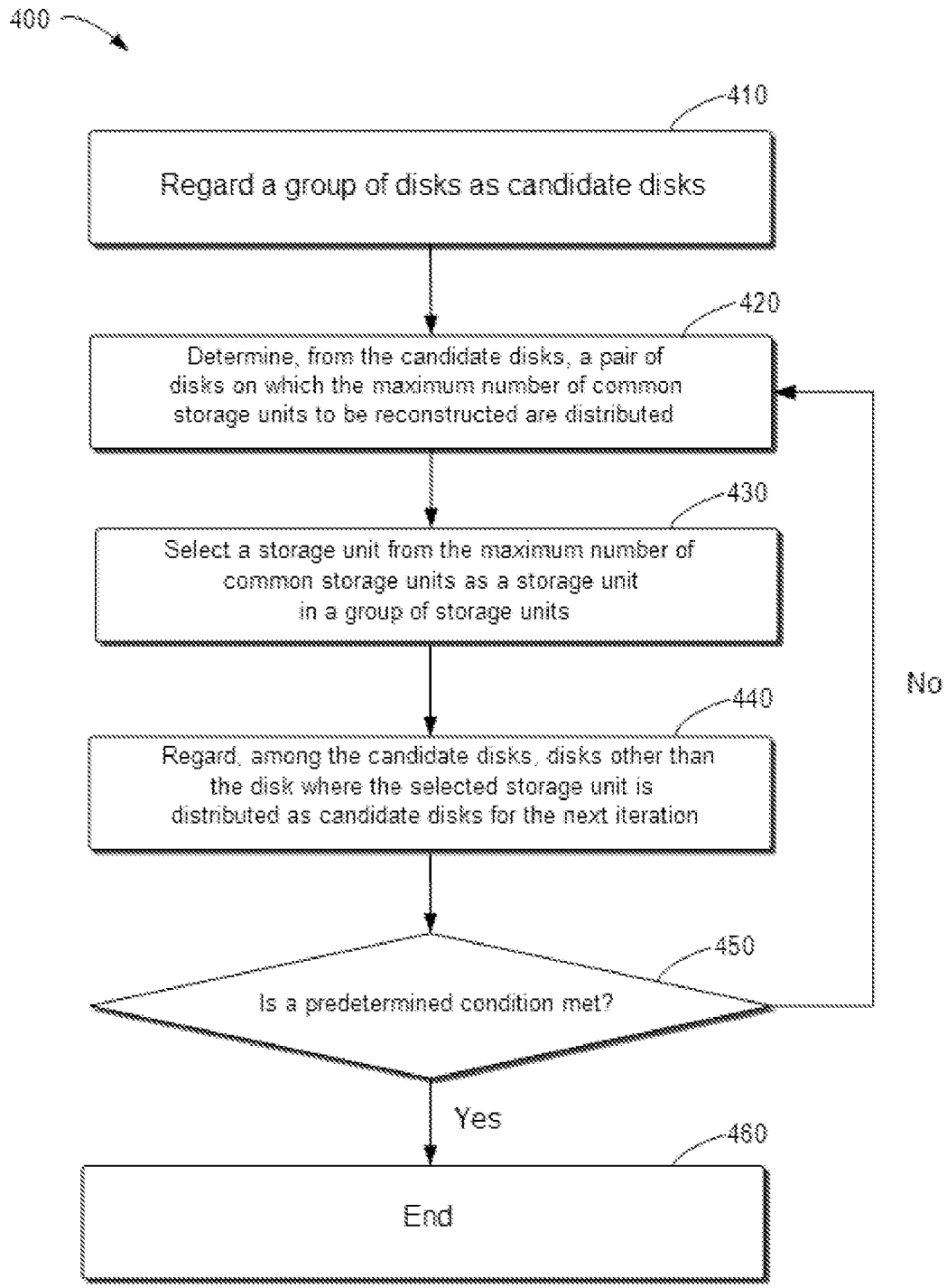
FIG. 4 shows a flow chart of an example method of selecting a group of storage units from a plurality of storage units to be reconstructed according to some embodiments of the present disclosure.

FIG. 4 shows a flow chart of example method 400 of selecting a group of storage units from a plurality of storage units to be reconstructed according to some embodiments of the present disclosure. Method 400 may be regarded as an example implementation of block 320 in method 300. Method 400 may be performed by, for example, computing device 201 (more specifically, a processor of computing device 201). Method 400 is described below with reference to FIG. 2.

At block 410, computing device 201 may start operations with a group of disks 205 as candidate disks. At block 420, computing device 201 may determine, from the candidate disks, a pair of disks on which the maximum number of common storage units to be reconstructed are distributed. It should be understood that there may be other common storage units that do not need to be reconstructed on the pair of disks. For the sake of brevity, unless expressly stated otherwise, when referring to the "common storage unit" of a pair of disks below, it refers to a storage unit to be reconstructed that is common to the pair of disks.

Figure 5:
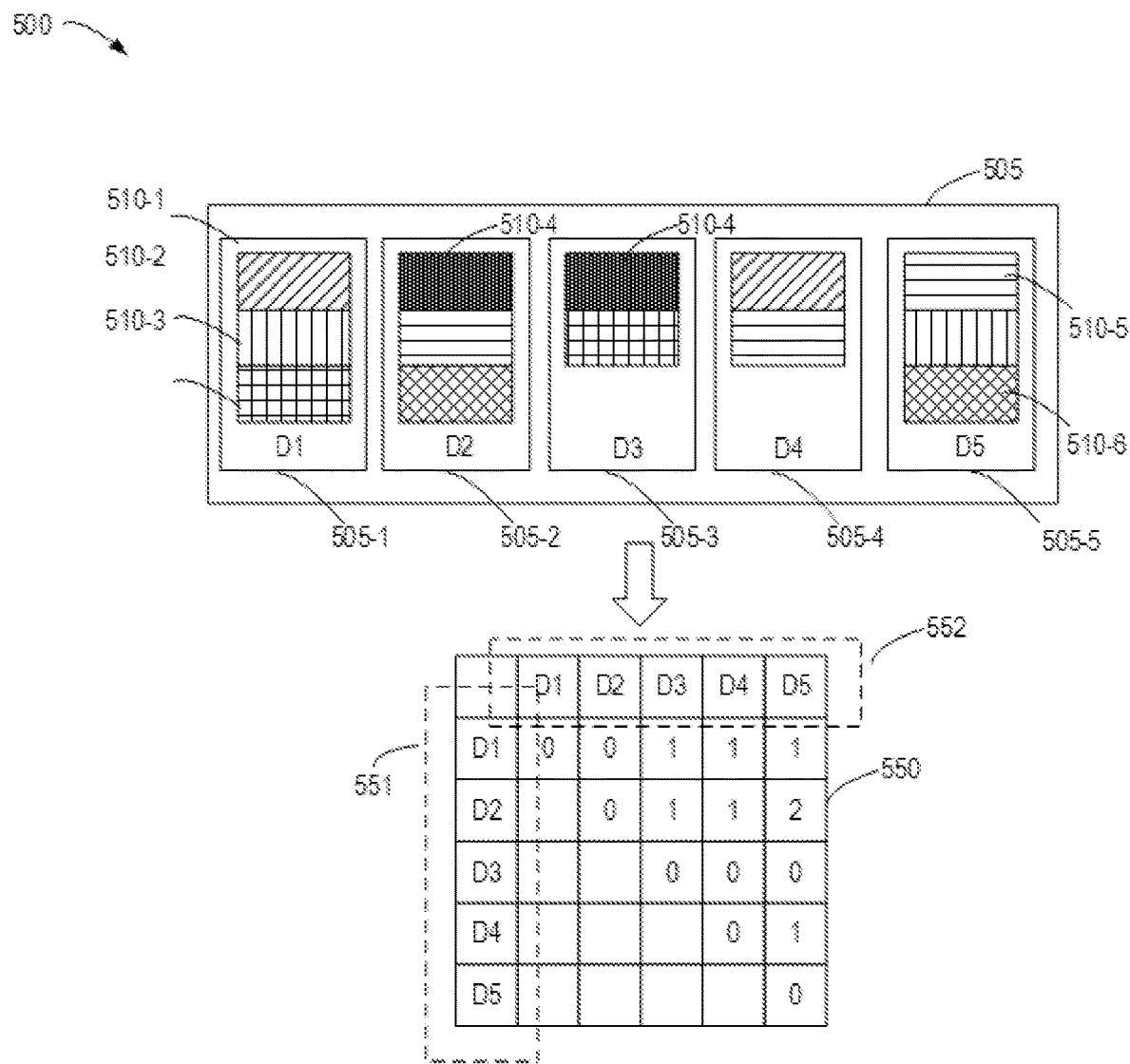
FIG. 5 shows an example of a group of disks according to some embodiments of the present disclosure and an example correlation matrix generated based on the group of disks, storage units to be reconstructed are distributed on the group of disks, and the correlation matrix shows the number of common storage units to be reconstructed for each pair of disks in the group of disks.

In some embodiments, computing device 201 may determine, by generating a correlation matrix about candidate disks, a pair of disks on which the maximum number of common storage units are distributed. FIG. 5 shows simplified example 500 of such correlation matrix. Example 500 illustrates an example group of disks 505 and correlation matrix 550 generated based on the group of disks 505. The group of disks 505 may be an example of the group of disks 205 in FIG. 2, and correlation matrix 550 may be generated, for example, by computing device 201. Generation of correlation matrix 550 will be described below with reference to FIG. 2.

In Example 500, computing device 201 determines that there are a plurality of storage units 510-1, 510-2, 510-3, 510-4, 510-5, and 510-6 that need to be reconstructed on a group of disks 505, wherein each of the storage units is distributed on a plurality of different disks (for example, as shown by reference numeral 510-4). The plurality of storage units to be reconstructed are illustrated as being continuously distributed in FIG. 5, which is only for the purpose of facilitating the illustration. It should be understood that the plurality of storage units to be reconstructed may also be distributed discontinuously with each other, and the group of disks 505 may also have other storage units that do not need to be reconstructed distributed thereon. Computing device 201 then starts operations with the group of disks 505 as candidate disks. In order to determine a pair of disks, among the group of disks 505, where the maximum number of common storage units are distributed, computing device 201 may generate correlation matrix 550 based on the distribution of the storage units to be reconstructed on the group of disks 505. Each row of correlation matrix 550 corresponds to one disk in the group of disks 550, as indicated by row header 551. Each column of correlation matrix 550 also corresponds to one disk in the group of disks 550, as indicated by column header 552. In correlation matrix 550, an element at an intersection of one row and one column indicates the number of common storage units of the disk corresponding to the row and the disk corresponding to the column. FIG. 5 only shows elements of the upper right half of correlation matrix 550. Because of the symmetry of correlation matrix 550, these elements are sufficient to indicate the number of storage units common to each pair of disks in the group of disks 505. In addition, as shown in FIG. 5, an element at an intersection of one row and one column corresponding to the same disk is marked as 0 in this example. It should be understood that in some other examples, these elements may also be marked as any other suitable values (for example, negative values) that do not affect the determination of a pair of disks.

In example 500, computing device 201 may determine from correlation matrix 505 that: in the group of disks 505, disk D2 505-2 and disk D5 505-5 have the maximum number of common storage units. Computing device 201 may generate a correlation matrix for another group of disks in the same way to determine a corresponding pair of disks.

Still referring to FIG. 4, at block 430, computing device 201 may select a storage unit from the common storage units of the pair of disks determined at block 420 as a storage unit in a group of storage units. Taking the group of disks 505 in FIG. 5 as an example, computing device 201 may select a storage unit from common storage units 510-5 and 510-6 of disk D2 505-2 and disk D5 505-5 as a storage unit in the group of storage units. For example, computing device 201 may randomly select storage unit 510-5 or storage unit 510-6, or select a storage unit based on other properties of the storage units, and the solution of the present disclosure is not limited thereto.

Back to FIG. 4, at block 440, computing device 201 may regard, among the candidate disks, disks other than the disk where the selected storage unit is distributed as candidate disks for the next iteration. Taking the group of disks 505 in FIG. 5 as an example again, assuming that computing device 201 has selected storage unit 510-5, then computing device 201 excludes, from the candidate disks of the current iteration, disk D2 505-2, disk D4 505-4, and disk D5 505-5 on which storage unit 510-5 is distributed, and regards remaining disk D1 505-1 and disk D3 505-3 as candidate disks for the next iteration.

Still referring to FIG. 4, at block 450, computing device 201 may determine whether a predetermined condition is met. In some embodiments, the predetermined condition may be that there is no longer a pair of disks, where a common storage unit is distributed, in the candidate disks. In some embodiments, the predetermined condition may be that storage units in the group of storage units as described above reach a threshold.

If the predetermined condition is met, method 400 proceeds to block 450 where computing device 201 completes the selection. If the predetermined condition is not met, method 400 returns to block 420 to start the next iteration to continue adding storage units to the group of storage units.

Figure 6:
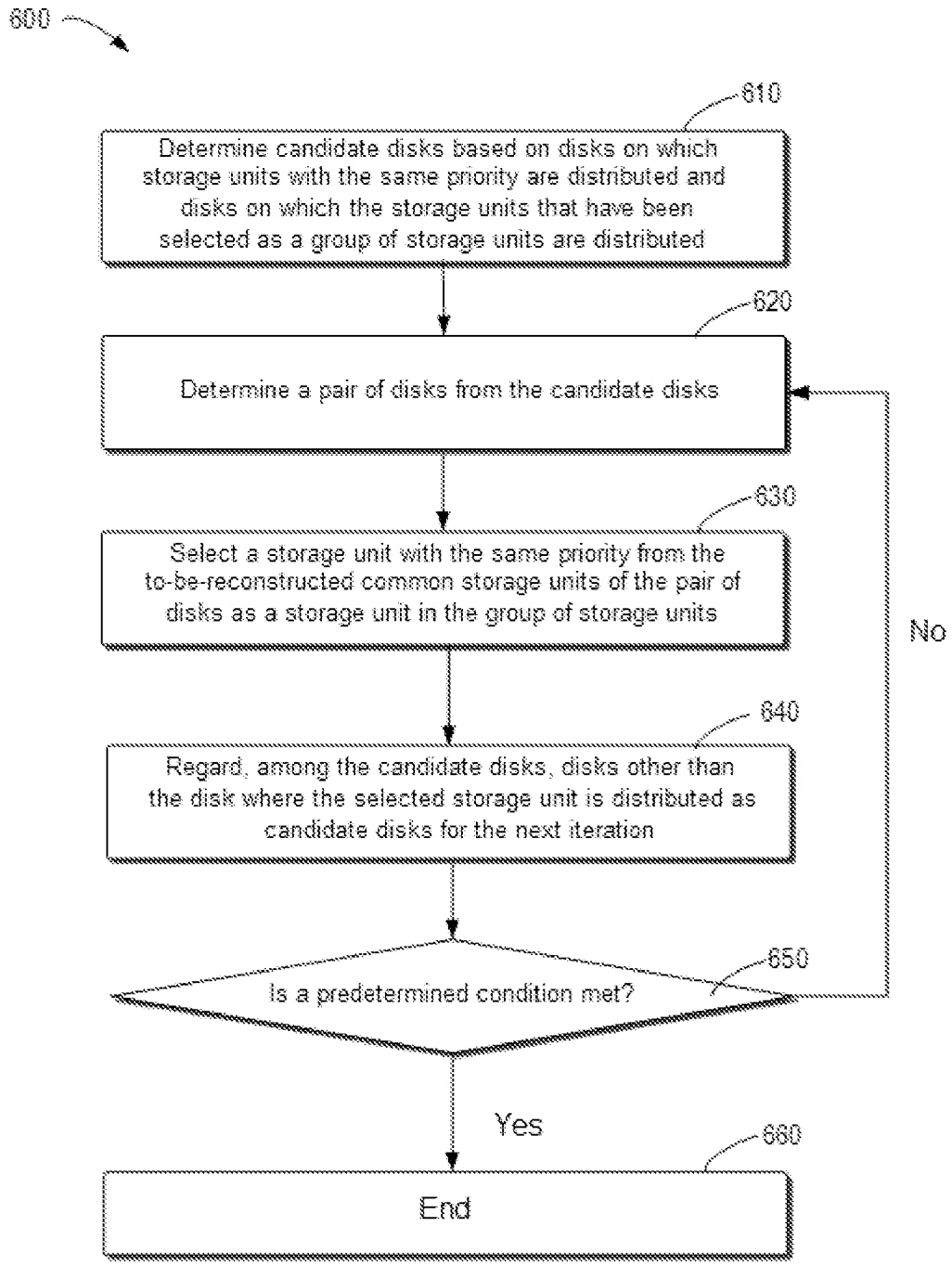
FIG. 6 shows a flow chart of an example method of selecting a group of storage units from a plurality of storage units to be reconstructed according to some embodiments of the present disclosure, wherein the plurality of storage units have different priorities.

FIG. 6 shows a flow chart of example method 600 of selecting a group of storage units from a plurality of storage units to be reconstructed according to some embodiments of the present disclosure, where the plurality of storage units have respective priorities. Method 600 may be regarded as an example implementation of block 320 in method 300. Method 600 may be performed by, for example, computing device 201 (more specifically, a processor of computing device 201). Method 600 is described below with reference to FIG. 2.

At block 610, computing device 201 may determine candidate disks based on disks on which storage units with the same priority are distributed and disks on which the storage units that have been selected as the group of storage units are distributed. In some embodiments, computing device 201 may have selected one or more storage units from storage units having other priorities (for example, another priority higher than the same priority) as a part of the group of storage units. In this case, when determining candidate disks, computing device 201 may remove, from the disks on which the storage units having the same priority are distributed, the disks on which the selected one or more storage units are distributed, and regard the remaining disks as candidate disks.

At block 620, computing device 201 may determine the following pair of disks from the candidate disks: the pair of disks having at least one common storage unit with the same priority distributed thereon, and in one or more pairs of disks on which at least one common storage unit having the same priority is distributed among the candidate disks, the pair of disks having the maximum number of common storage units distributed thereon.

In some embodiments, in a manner similar to that described with reference to FIG. 5, computing device 201 may determine the pair of disks by generating a correlation matrix. For example, after the correlation matrix corresponding to candidate disks is generated, computing device 201 may determine, according to an order of elements in the matrix from large to small, whether a pair of disks corresponding to the elements has common storage units having the same priority distributed thereon, and regard the determined first pair of disks as the pair of disks. At block 630, computing device 201 may select (for example, randomly or based on additional conditions) a storage unit having the same priority from the common storage units of the pair of disks determined at block 630 as a storage unit in the group of storage units.

At block 640, computing device 201 regards, among the candidate disks, disks other than the disk where the selected storage unit is distributed as candidate disks for the next iteration. At block 650, computing device 201 may determine whether a predetermined condition is met. In some embodiments, the predetermined condition may be that: there is no longer a pair of disks on which common storage units having the same priority are distributed among the candidate disks. In some embodiments, the predetermined condition may be that storage units in the group of storage units as described above reach a threshold.

If the predetermined condition is not met, method 600 returns to block 620 to start the next iteration to continue adding storage units to the group of storage units. If the predetermined condition is met, computing device 201 ends the selection for storage units of the same priority.

In some embodiments, after completing the selection for a certain priority, computing device 201 may use method 600 to select storage units for another priority (for example, a lower priority), so as to continue to add storage units to the group of storage units.

Figure 7:
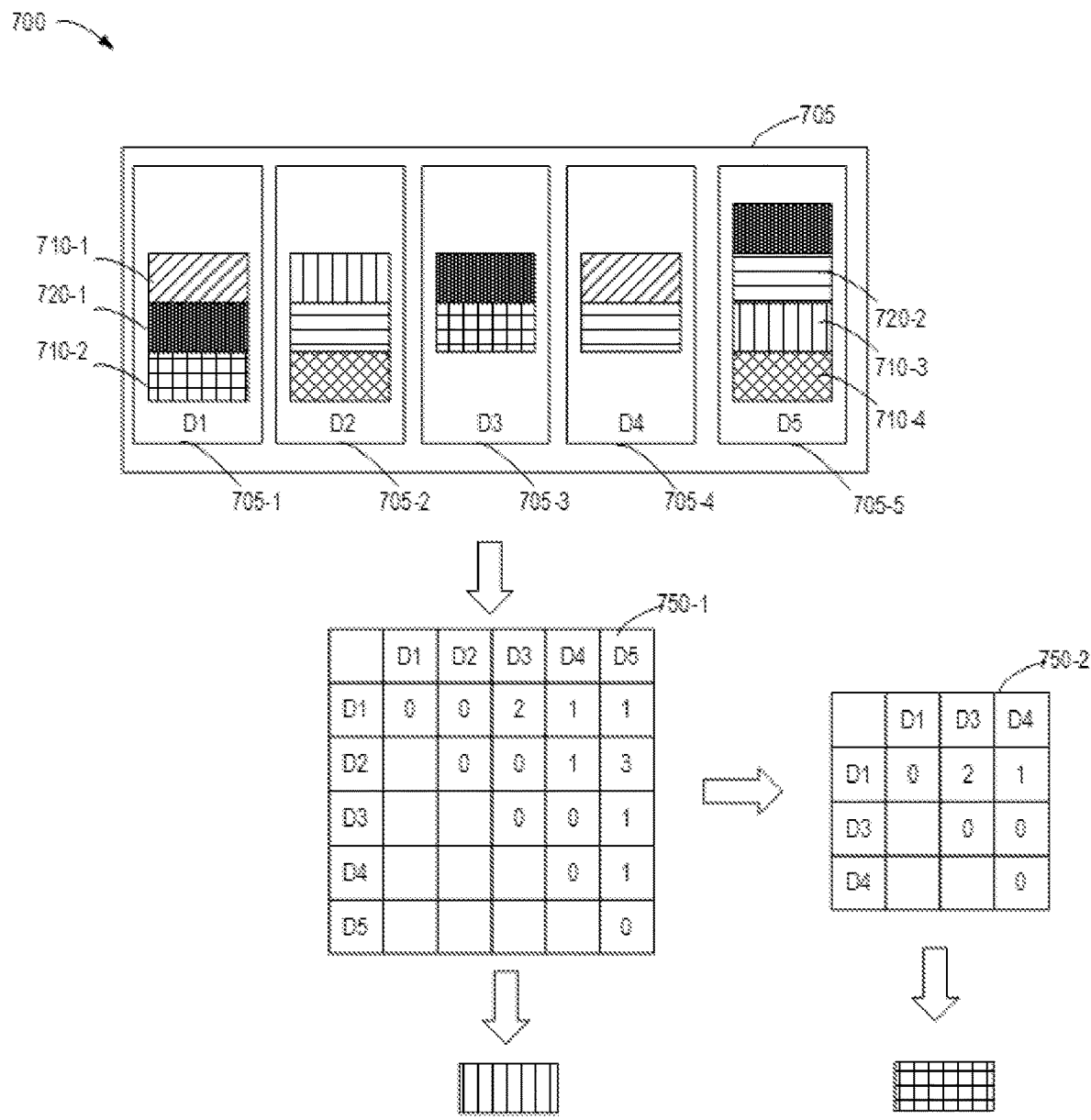
FIG. 7 shows a simplified example according to some embodiments of the present disclosure, in which the method of FIG. 6 is used for selecting a group of storage units from a plurality of storage units to be reconstructed.

FIG. 7 shows simplified example 700 according to some embodiments of the present disclosure, in which method 600 shown in FIG. 6 is used for selecting a group of storage units from a plurality of storage units to be reconstructed. Example 700 may be performed by, for example, computing device 201 (more specifically, a processor of computing device 201). Example 700 is described below with reference to FIG. 2.

In example 700, computing device 201 has determined that there are a plurality of storage units to be reconstructed on a group of disks 705, where storage units 710-1, 710-2, 710-3, and 710-4 have a higher first priority, and storage units 720-1 and 720-2 have a lower second priority. The group of disks 705 may be an example of the group of disks 202 in FIG. 2.

In example 700, computing device 201 starts operations for the first priority and performs the selection with the help of the correlation matrix described with reference to FIG. 5. As shown in FIG. 7, storage units 710-1, 710-2, 710-3, and 710-4 having the first priority are distributed on disks 705-1 to 705-5. Since no storage unit has been selected as a storage unit in a group of storage units, computing device 201 regards disks 705-1 to 705-5 as candidate disks and generates correlation matrix 750-1 for the candidate disks. Computing device 201 may determine from correlation matrix 750-1 that disks D2 705-2 and D5 705-5 have the maximum number of common storage units. Among these common storage units, storage units 710-3 and 710-4 have the first priority. Therefore, computing device 201 may select a storage unit from storage units 710-3 and 710-4 (as an example, select storage unit 710-3) as a storage unit in the group of storage units.

Then, computing device 201 removes, from the previous candidate disks, disks D2 705-2 and D5 705-5 on which selected storage unit 710-4 is distributed, and regards the remaining disks (i.e., disks D1 705-1, D3 705-2, and D4 705-3) as candidate disks to generate correlation matrix 750-2. Computing device 201 may determine from correlation matrix 750-2 that disks D1 705-1 and D3 705-3 have the maximum number of common storage units. Among these common storage units, storage unit 710-2 has the first priority. Therefore, computing device 201 selects storage unit 710-2 as a storage unit in the group of storage units.

Next, computing device 201 removes, from the previous candidate disks, disks D1 705-1 and D3 705-3 on which selected storage unit 710-2 is distributed. After this round of iteration, only one disk, D4 705-4, may continue to be regarded as a candidate disk. Therefore, computing device 201 ends the selection, and the selected group of storage units is composed of storage units 710-2 and 710-3. Computing device 201 may then perform concurrent reconstruction on the selected group of storage units. After completing the concurrent reconstruction, computing device 201 may also continue to perform concurrent reconstruction by, for example, method 600 to select another group of storage units from the remaining storage units to be reconstructed.

Figure 8:
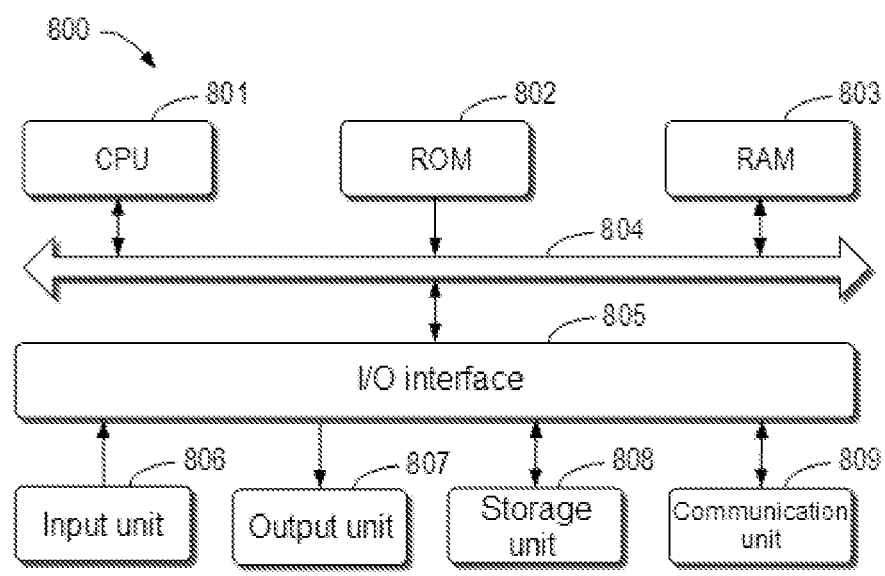
FIG. 8 shows a schematic block diagram of a device that may be configured to implement embodiments of the present disclosure.

FIG. 8 shows a schematic block diagram of example device 800 that may be configured to implement the embodiments of the content of the present disclosure. As shown in FIG. 8, device 800 includes central processing unit (CPU) 801, which may execute various appropriate actions and processing in accordance with computer program instructions stored in read-only memory (ROM) 802 or computer program instructions loaded onto random access memory (RAM) 803 from storage unit 805. Various programs and data required for the operation of device 800 may also be stored in RAM 803. CPU 801, ROM 802, and RAM 803 are connected to each other through bus 804. Input/output (I/O) interface 808 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices via a computer network, such as the Internet, and/or various telecommunication networks.

The various processes and processing described above, such as method 200 and/or method 400, may be executed by processing unit 801. For example, in some embodiments, method 200 and/or method 400 may be implemented as computer software programs that are tangibly included in a machine-readable medium, such as storage unit 808. In some embodiments, part or all of the computer program may be loaded and/or installed onto device 800 via ROM 802 and/or communication unit 809. When the computer program is loaded to RAM 803 and performed by CPU 801, one or more actions in methods 300, 400, and/or 600 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method for storage management, comprising:
   determining a plurality of storage units to be reconstructed on a group of disks, the plurality of storage units being distributed on different disks in the group of disks;
   selecting, based on the distribution of the plurality of storage units on the group of disks, a group of storage units from the plurality of storage units so that different storage units in the group of storage units are distributed on different disks; and performing concurrent reconstruction on the group of storage units;

wherein storage units in the plurality of storage units have respective priorities, and selecting the group of storage units comprises:

selecting one or more storage units from storage units with a same priority as storage units in the group of storage units, so that different storage units in the group of storage units are distributed on different disks;

wherein selecting the one or more storage units from storage units with the same priority comprises:

determining candidate disks based on disks on which the storage units with a same priority are distributed and disks on which the storage units that have been selected as the group of storage units are distributed; and performing operations as follows on the candidate disks:

determining a pair of disks from the candidate disks, wherein at least one common storage unit as follows is distributed on the pair of disks, and in one or more pairs of disks on which the at least one common storage unit is distributed among the candidate disks:

the at least one common storage unit being to be reconstructed and having the same priority; and selecting a storage unit with the same priority from the common storage units to be reconstructed of the pair of disks as the storage unit in the group of storage units.

2. The method according to claim 1, wherein selecting the group of storage units from the plurality of storage units comprises performing additional operations as follows with the group of disks as the candidate disks until a predetermined condition is met:

determining, from the candidate disks, a pair of disks on which a maximum number of common storage units to be reconstructed are distributed;

selecting a storage unit from the maximum number of common storage units to be reconstructed as a storage unit in the group of storage units; and regarding, among the candidate disks, disks other than the disk where the selected storage unit is distributed as candidate disks for a next iteration.

3. The method according to claim 2, wherein the predetermined condition comprises that: there is no longer a pair of disks on which common storage units to be reconstructed are distributed among the candidate disks.

4. The method according to claim 1, wherein the operations on the candidate disks are performed until there is no longer a pair of disks on which common storage units to be reconstructed and having the same priority are distributed among the candidate disks;

wherein a maximum number of common storage units to be reconstructed are distributed on the pair of disks; and wherein the operations on the candidate disks further include:

regarding, among the candidate disks, disks other than the disk where the selected storage unit is distributed as candidate disks for a next iteration.

5. The method according to claim 1, wherein the group of storage units does not exceed a threshold.

6. The method according to claim 1, wherein determining the pair of disks from the candidate disks includes:

generating a correlation matrix that indicates, for pairs of disks in the group of disks, respective numbers of common storage units to be reconstructed, the pairs of disks providing storage to the respective numbers of common storage units.

7. The method according to claim 1, further comprising:

providing storage units in the plurality of storage units as redundant array of independent disk (RAID) stripes that include storage of respective disks in the group of disks.

8. An electronic device, comprising:

a memory coupled to a processor, wherein the memory has instructions stored therein, and the instructions, when executed by the processor, cause the device to execute actions comprising:

determining a plurality of storage units to be reconstructed on a group of disks, the plurality of storage units being distributed on different disks in the group of disks;

selecting, based on the distribution of the plurality of storage units on the group of disks, a group of storage units from the plurality of storage units so that different storage units in the group of storage units are distributed on different disks; and performing concurrent reconstruction on the group of storage units;

wherein storage units in the plurality of storage units have respective priorities, and selecting the group of storage units comprises:

selecting one or more storage units from storage units with a same priority as storage units in the group of storage units, so that different storage units in the group of storage units are distributed on different disks;

wherein selecting the one or more storage units from storage units with the same priority comprises:

determining candidate disks based on disks on which the storage units with a same priority are distributed and disks on which the storage units that have been selected as the group of storage units are distributed; and performing operations as follows on the candidate disks:

determining a pair of disks from the candidate disks, wherein at least one common storage unit as follows is distributed on the pair of disks, and in one or more pairs of disks on which the at least one common storage unit is distributed among the candidate disks:

the at least one common storage unit being to be reconstructed and having the same priority; and selecting a storage unit with the same priority from the common storage units to be reconstructed of the pair of disks as the storage unit in the group of storage units.

9. The device according to claim 8, wherein selecting the group of storage units from the plurality of storage units comprises performing additional operations as follows with the group of disks as the candidate disks until a predetermined condition is met:

determining, from the candidate disks, a pair of disks on which the maximum number of common storage units to be reconstructed are distributed;

selecting a storage unit from the maximum number of common storage units to be reconstructed as a storage unit in the group of storage units; and regarding, among the candidate disks, disks other than the disk where the selected storage unit is distributed as candidate disks for the next iteration.

10. The device according to claim 9, wherein the predetermined condition comprises that: there is no longer a pair of disks on which common storage units to be reconstructed are distributed among the candidate disks.

11. The device according to claim 8,
wherein the operations on the candidate disks are performed until there is no longer a pair of disks on which common storage units to be reconstructed and having the same priority are distributed among the candidate disks;
wherein a maximum number of common storage units to be reconstructed are distributed on the pair of disks; and
wherein the operations on the candidate disks further include:
regarding, among the candidate disks, disks other than the disk where the selected storage unit is distributed as candidate disks for a next iteration.

12. The device according to claim 8, wherein the group of storage units does not exceed a threshold.

13. A computer program product having a non-transitory computer readable medium which stores a set of instructions to perform storage management; the set of instructions, when carried out by computerized circuitry, causing the computerized circuitry to perform a method of:
determining a plurality of storage units to be reconstructed on a group of disks, the plurality of storage units being distributed on different disks in the group of disks;
selecting, based on the distribution of the plurality of storage units on the group of disks, a group of storage units from the plurality of storage units so that different storage units in the group of storage units are distributed on different disks; and
performing concurrent reconstruction on the group of storage units;
wherein storage units in the plurality of storage units have respective priorities, and selecting the group of storage units comprises:
selecting one or more storage units from storage units with a same priority as storage units in the group of storage units, so that different storage units in the group of storage units are distributed on different disks;
wherein selecting the one or more storage units from storage units with the same priority comprises:
determining candidate disks based on disks on which the storage units with a same priority are distributed and disks on which the storage units that have been selected as the group of storage units are distributed; and
performing operations as follows on the candidate disks:
determining a pair of disks from the candidate disks, wherein at least one common storage unit as follows is distributed on the pair of disks, and in one or more pairs of disks on which the at least one common storage unit is distributed among the candidate disks:
the at least one common storage unit being to be reconstructed and having the same priority; and
selecting a storage unit with the same priority from the common storage units to be reconstructed of the pair of disks as the storage unit in the group of storage units.

14. The computer program product according to claim 13, wherein selecting the group of storage units from the plurality of storage units comprises performing additional operations as follows with the group of disks as the candidate disks until a predetermined condition is met:
determining, from the candidate disks, a pair of disks on which a maximum number of common storage units to be reconstructed are distributed;
selecting a storage unit from the maximum number of common storage units to be reconstructed as a storage unit in the group of storage units; and
regarding, among the candidate disks, disks other than the disk where the selected storage unit is distributed as candidate disks for a next iteration.

15. The computer program product according to claim 14, wherein the predetermined condition comprises that: there is no longer a pair of disks on which common storage units to be reconstructed are distributed among the candidate disks.

16. The computer program product according to claim 13, wherein the operations on the candidate disks are performed until there is no longer a pair of disks on which common storage units to be reconstructed and having the same priority are distributed among the candidate disks;
wherein a maximum number of common storage units to be reconstructed are distributed on the pair of disks; and
wherein the operations on the candidate disks further include:
regarding, among the candidate disks, disks other than the disk where the selected storage unit is distributed as candidate disks for a next iteration.

17. The computer program product according to claim 13, wherein the group of storage units does not exceed a threshold.

* * * * *